United States Patent
Noguchi et al.

(10) Patent No.: US 7,555,202 B2
(45) Date of Patent: Jun. 30, 2009

(54) DIGITAL DAT RECORDING/REPRODUCING APPARATUS

(75) Inventors: Tadashi Noguchi, Tokorozawa (JP); Akihiro Tozaki, Tsurugashima (JP); Hidehiro Ishii, Tokorozawa (JP)

(73) Assignee: Pioneer Electronic Corporation, Tokyo (JP)

( * ) Notice: Subject to any disclaimer, the term of this patent is extended or adjusted under 35 U.S.C. 154(b) by 1537 days.

(21) Appl. No.: 10/207,845

(22) Filed: Jul. 31, 2002

(65) Prior Publication Data

US 2002/0176701 A1    Nov. 28, 2002

Related U.S. Application Data

(63) Continuation of application No. 09/271,989, filed on Mar. 19, 1999, now Pat. No. 6,445,873.

(30) Foreign Application Priority Data

Mar. 20, 1998    (JP)    ................................. 10-71741

(51) Int. Cl.
    *H04N 7/00*     (2006.01)
(52) U.S. Cl. ........................... 386/96; 386/97; 386/104; 386/105; 386/106; 386/124; 386/126; 386/95; 360/18; 360/32
(58) Field of Classification Search ................. 386/104, 386/95, 96–97, 46, 124–126, 106, 110, 69, 386/105, 111–112, 52, 33, 27, 70, 18, 32
See application file for complete search history.

(56) References Cited

U.S. PATENT DOCUMENTS

| | | | | |
|---|---|---|---|---|
| 5,671,319 A | * | 9/1997 | Ueda | ............................ 386/96 |
| 5,742,569 A | * | 4/1998 | Yamamoto et al. | ........ 369/30.18 |
| 5,784,520 A | * | 7/1998 | Takeda | ......................... 386/69 |
| 5,884,004 A | * | 3/1999 | Sato et al. | ...................... 386/98 |
| 5,902,115 A | * | 5/1999 | Katayama | ................ 434/307 A |
| 5,913,010 A | | 6/1999 | Kaneshige et al. | ............. 386/70 |
| 6,006,004 A | * | 12/1999 | Moriyama et al. | ............. 386/46 |
| 6,148,138 A | | 11/2000 | Sawabe et al. | ................. 386/69 |
| 6,263,155 B1 | * | 7/2001 | Saeki et al. | ................... 386/125 |
| 6,266,478 B1 | * | 7/2001 | Yoshio et al. | .................. 386/46 |

FOREIGN PATENT DOCUMENTS

EP     0 797 205 A2    9/1997

(Continued)

*Primary Examiner*—Thai Tran
*Assistant Examiner*—Jamie Jo Atala
(74) *Attorney, Agent, or Firm*—Drinker Biddle & Reath LLP

(57) ABSTRACT

A digital data recording/reproducing apparatus which divides each of information data pieces into a plurality of cells, further divides each of the cells into a series of a plurality of units, and records the units. The digital data recording/reproducing apparatus has means for recording a required time for reproduction until the head position of a unit is reached, with reference to the head position of an information data cell to which a cell belongs, as a unit start time, in addition to each of the units, and means for recording a cell start time ($T_s$) equal to a required time for reproduction until the head position of each of the cells is reached, and a required time for reproduction ($P_s$) of each of the cells in a management data region.

13 Claims, 11 Drawing Sheets

FOREIGN PATENT DOCUMENTS

| | | |
|---|---|---|
| EP | 0 814 475 A1 | 12/1997 |
| EP | 0 903 743 A2 | 3/1999 |
| EP | 0 903 744 A2 | 3/1999 |
| EP | 0 929 072 A2 | 7/1999 |
| EP | 0 942 426 A2 | 9/1999 |
| EP | 1 035 546 A1 | 9/2000 |
| WO | 00/30112 A1 | 5/2000 |
| WO | 00/30113 A1 | 5/2000 |

\* cited by examiner

FIG. 5

| TV SYSTEM | COMPRESSION | ASPECT RATIO | RESOLUTION | AUDIO STREAM | AUDIO CODING |
|---|---|---|---|---|---|
| 525/60 | MPEG2 | 4:3 | 720×480 | 0 | NA |
| | | | | 1 | AC-3 |
| | | | | 1 | LINEAR |
| | | | 352×480 | 1 | AC-3 |
| | | | 352×240 | 1 | AC-3 |
| | MPEG1 | | 352×240 | 1 | AC-3 |
| 625/50 | MPEG2 | 4:3 | 720×576 | 0 | NA |
| | | | | 1 | MPEG |
| | | | | 1 | LINEAR |
| | | | 352×576 | 1 | MPEG |
| | | | 352×288 | 1 | MPEG |
| | MPEG1 | 4:3 | 352×288 | 1 | MPEG |

DIGITAL DAT RECORDING/REPRODUCING APPARATUS

This is a continuation of application Ser. No. 09/271,989 filed on Mar. 19, 1999 now U.S. Pat. No. 6,445,873.

BACKGROUND OF THE INVENTION

1. Field of the Invention

The present invention relates generally to a digital data recording/reproducing apparatus, and more particularly to a digital data recording/reproducing apparatus for recording/reproducing digital data compressed in accordance with a variable bit rate encoding scheme.

2. Description of Related Background Art

At present, widespread video and audio media include a laser disk (LD), a VHS video and so on in the analog scheme, and a mini-disk (MD), a compact disc (CD) and so on in the digital scheme. On the other hand, as package media for the next generation, technological developments have been vigorously advanced for practical use of a rewritable digital versatile disk (DVD-R/W) which enables recording and reproduction of images and sound with high quality for a long time. In a recording method using DVD-R/W, information data pieces such as a movie, audio and so on can be recorded on a disk in high density. Image data are recorded/reproduced in accordance with a highly efficient encoding scheme such as MPEG2, while audio data are recorded/reproduced in accordance with compression schemes such as PCM, AC3 or the like. In the following, a collection of data such as a full program, a full movie or the like is called an "information data piece", and data which includes one or a plurality of information data piece is called an "information data group".

In a recording/reproducing scheme for a conventional recordable and erasable digital data recording/reproducing apparatus, for example, MD, an audio information data piece is again divided into a plurality of subpieces, each of which is given address information that is relied on to display a playing time and to search for particular data. Stated another way, since MD has a fixed compression ratio for audio data, an actually required time for reproduction can be unitarily calculated by multiplying the amount of data by a playing time per unit time. Therefore, a data region is comprised only of audio data and does not include time information on reproduction.

However, as a method of extending a recording time for images, DVD-R/W has employed a "variable bit rate coding: VBR" which changes the amount of codes in accordance with a change in the amount of information in an image in place of a conventional "constant bit rate coding: CBR", so that an actually required time for reproduction cannot be calculated directly from the amount of compressed data. In other words, it is not possible to use a conventional approach of deriving a playing time from the address of a reproduced position. Also, while DVD-R/W has a feature of providing an erasable recording medium, recorded time information becomes discontinuous if the user erases a desired region or the like, thereby causing impediments to a time search, a playing time display, and so on.

OBJECT AND SUMMARY OF THE INVENTION

As described above, when digital data compressed using a variable bit rate coding is recorded/reproduced, a time required for reproduction cannot be derived directly from the address of a reproduced position, thereby giving rise to a problem that a time search, a playing time display, and so on are prevented. The present invention has been made in view of the problem as mentioned, and its object is to provide a digital data recording/reproducing apparatus which is capable of deriving playing-time information even on a midway position of information data that has undergone editing such as chapter setting, erasure or the like after recording, when such information data is reproduced from the midway position.

To achieve the above object, the present invention provides a digital data recording/reproducing apparatus for dividing each of information data pieces into a plurality of segments to sequentially record the segments in an information data region on a recording medium, additionally recording a plurality of management data corresponding to each of one or a plurality of information data groups each including one or a plurality of the information data pieces, in a management data region on the recording medium, and reproducing the information data pieces on the basis of the management data. The digital data recording/reproducing apparatus comprises means for dividing each of the segments into a series of a plurality of units, and recording a required time for reproduction from a head position of an information data piece, to which the segment belongs, to a head position of each of the units as a unit start time in addition to each of the units, and means for recording a segment start time ($T_s$) equal to a required time for reproduction from a head position of an information data piece, to which the segments belong, to ahead position of each of the segments, and a required time for reproduction ($P_s$) of each of the segments in the management data region.

BRIEF DESCRIPTION OF THE DRAWINGS

FIG. 5 is a table showing attribute information data according to the present invention;

DETAILED DESCRIPTION OF THE PREFERRED EMBODIMENT

An embodiment of the present invention will hereinafter be described in detail with reference to the accompanying drawings.

Figure 1:
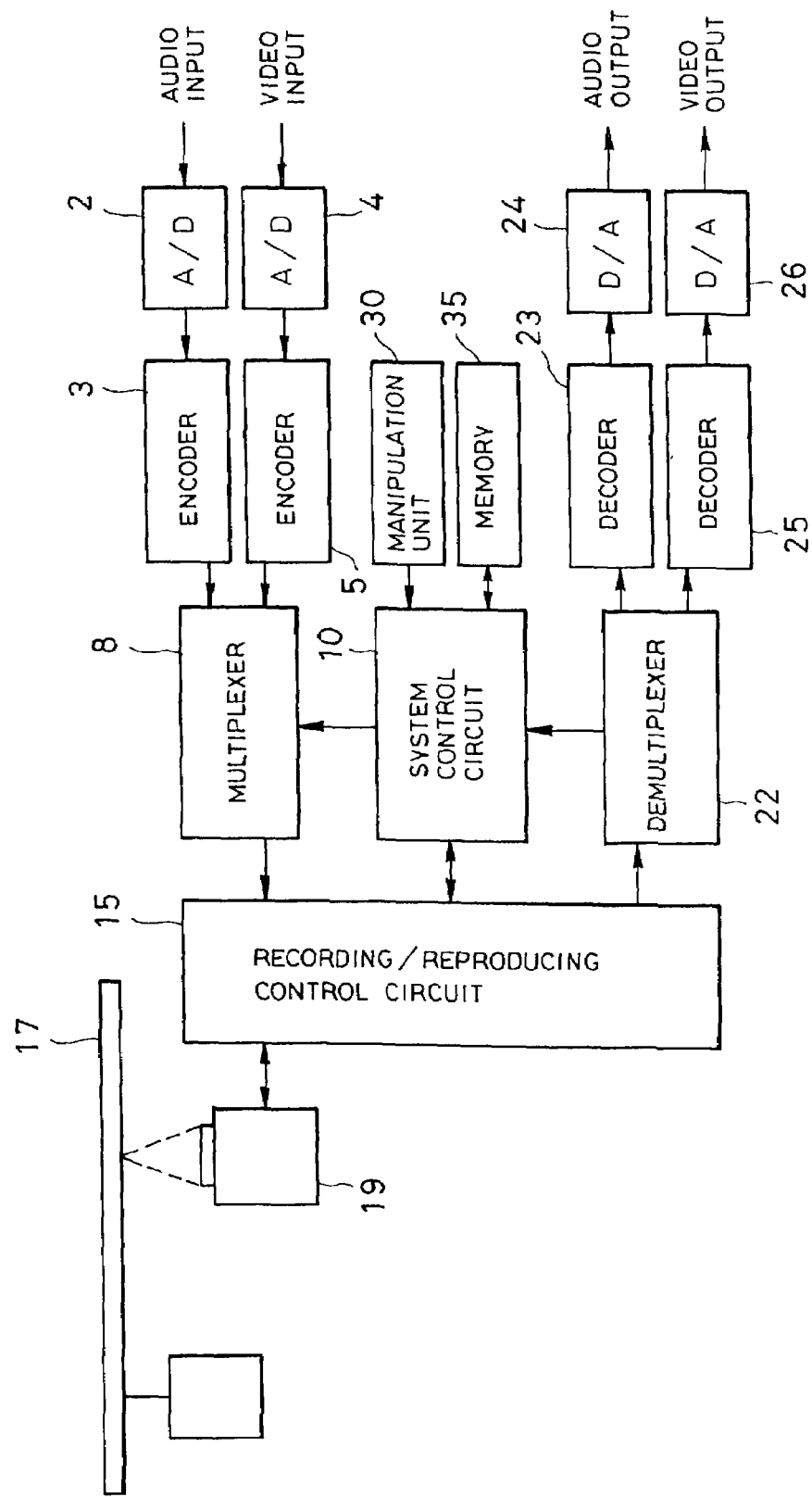
FIG. 1 is a block diagram illustrating the configuration of a digital data recording/reproducing apparatus according to the present invention.

FIG. 1 illustrates the configuration of a digital data recording/reproducing apparatus according to the present invention.

The digital data recording/reproducing apparatus in FIG. 1 is provided with an analog audio signal and video signal, for example, from a television tuner or the like as a source. An input audio signal is converted to a digital form by an A/D converter 2, and supplied to an audio encoder 3, while a video signal is converted to a digital form by an A/D converter 4 and supplied to a video encoder 5.

The audio encoder 3 applies a predetermined code conversion (for example, data compression processing) to a digital audio signal, and supplies its code converted output to a first input of a multiplexer 8. The video encoder 5 applies a predetermined code conversion (for example, compress processing) to a digital video signal, and supplies its code converted output to a second input of the multiplexer 8. The multiplexer 8 is also supplied at a third input thereof with an management data signal produced by a system control circuit 10. The multiplexer 8 time-division-multiplexes the first, second and third input signals to produce a multiplexed information signal composed of the audio and video information data signals and the management data signal.

The multiplexed information signal is supplied to a recording/reproducing control circuit 15 and recorded on a rewritable recording medium such as a rewritable DVD-R/W or the like.

In a reproducing mode for reproducing recorded information on a recording medium 17, the recording/reproducing control circuit 15 supplies a multiplexed information signal read by a recording/reproducing head 19 to a demultiplexer 22. The demultiplexer 22 time-division-demultiplexes the multiplexed information signal supplied thereto to separately output an audio signal, a video signal and a management data signal equivalent to those at the respective inputs of the multiplexer 8.

An audio signal output from the demultiplexer 22 is supplied to an audio decoder 23 which applies the audio signal with conversion processing reverse to the code conversion performed in the encoder 3 (for example, decompression processing). The reversely converted output is further converted to an analog form by a D/A converter 24 and delivered as an analog audio output. A video signal output from the demultiplexer 22 is supplied to a video decoder 25 which applies the video signal with a conversion processing reverse to the code conversion performed in the encoder 5 (for example, decompression processing). The reversely converted output is converted to an analog form by a D/A converter 26 and delivered as an analog video output.

In a recording mode for recording audio and video signals, a recording/reproducing head 19 writes a multiplexed information signal into a recording medium 17 in a predetermined format under the control of the recording/reproducing control circuit 15 which follows instructions from the system control circuit 10. In this event, the multiplexed information signal is also supplied to the demultiplexer 22. The flow of signal processing in successive components including the demultiplexer 22 subsequent to the recording/reproducing control circuit 15 in the recording mode is similar to the foregoing.

A recording medium 17 loaded into the recording/reproducing apparatus of the present invention may be a recording medium which permits overwriting of information previously recorded thereon, other than the aforementioned DVD-R/W.

The system control circuit 10 also issues instruction signals for controlling a read operation and a write operation to the recording/reproducing control circuit 15. Any of these instruction signals includes address information indicative of an actually recorded position or a region on a loaded recording medium. With the address information, information can be written at an arbitrary recording position on the recording medium, and information can be read from an arbitrary recorded position. Briefly, the system control circuit 10 performs an address control for accessing an arbitrary recorded position on a recording medium in the reproduction and recording modes for reproducing and recording information from and on the recording medium.

The system control circuit 10 further controls other components in response to instruction signals from a manipulation unit 30 serving as a user interface unit. Representative ones of the instruction signals include recording/reproducing instructions, and editing instructions such as a chapter setting instruction or an erasure instruction during a reproduction or recording operation. Therefore, the manipulation unit 30 serves as change instruction generating means for generating a change instruction in an editing mode.

The system control circuit 10 can force associated components to perform operations in accordance with the contents of manipulations of the manipulation unit 30, using a memory 35 for storing data indicative of the aforementioned recording/reproducing or edit instruction, and data read from the recording medium 17.

While the foregoing description has been made for a digital data recording/reproducing apparatus, taken as an example, which is supplied with data from a television tuner or the like as a source, the present invention is not limited to such a configuration. Alternatively, the digital data recording/reproducing apparatus of the invention may take a form in which external input terminals for audio and video signals are provided for directly leading them to the multiplexer 8, instead of providing a television tuner, A/D converters 2, 4 and encoders 3, 5, such that these external input terminals can be supplied with an audio digital signal and a video digital signal which have previously undergone code conversions such as those executed in the encoders 3, 5.

The system control circuit 10 and the recording/reproducing control circuit 15 are commonly used as recording control means and reproduction control means.

Next, the embodiment of the present invention will be described with reference to the accompanying drawings.

Figure 2:
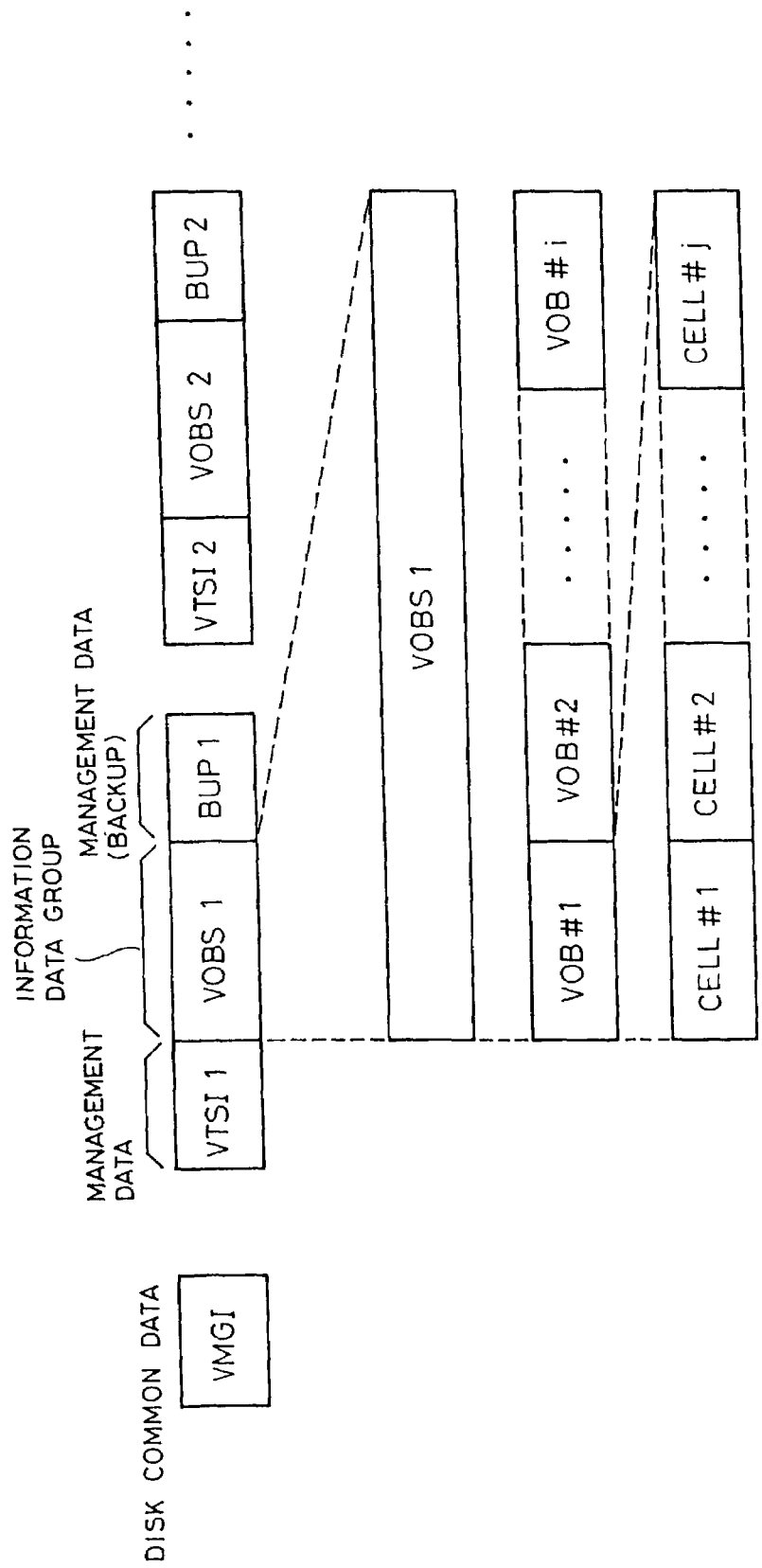
FIG. 2 is a schematic diagram for explaining the structure of data which is recorded on a disk.

FIG. 2 shows the structures of an information data group and management data which are recorded on a recording medium. VMGI stores disk common data associated with the information data group, which is data for generally managing a disk, for example, menu data or the like for a disk. Video Object Set (VOBS) is an information data group which collects one or a plurality of Video Objects (VOB), each of which is a set of information data pieces, for example, a full program, a full movie or the like. Video Title Set Information (VTSI) is management data associated with VOBS. BUP is backup data for VTSI, and contains the same contents as VTSI. VOB is further divided into a plurality of segments, each of which is hereinafter called a "cell."

Figure 3:
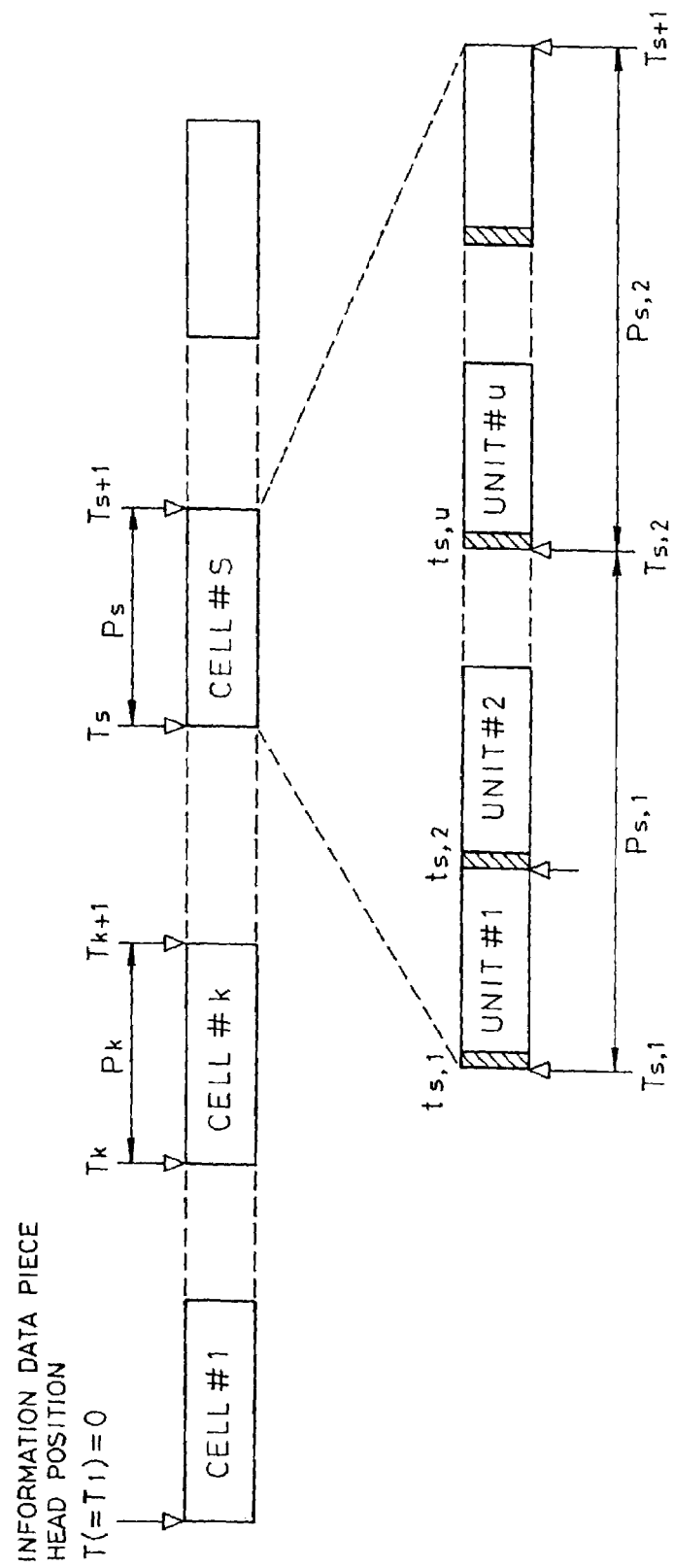
FIG. 3 is a schematic diagram for explaining the structure of data and time information which are recorded on a disk according to the present invention.
Figure 4:
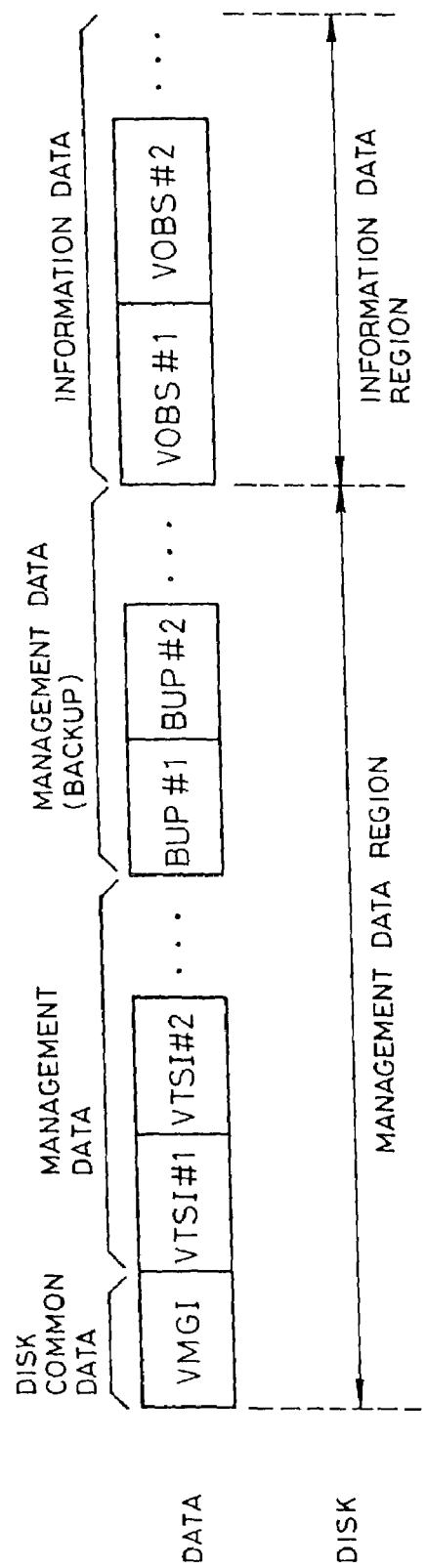
FIG. 4 is a schematic diagram showing a data structure and recording regions according to the present invention.

FIGS. 3 and 4 are schematic diagrams for explaining an example of a data structure recorded on an optical disk which serves as a recording medium in the digital data recording/reproducing apparatus according to the present invention. In the present invention, each of cells is divided into a series of plural units as shown in FIG. 3, and a required time for reproduction ($t_{s,u}$) from the head position (time T=0) of an information data piece, to which a cell belongs, to the head position of each of the units is additionally recorded in the cell as a unit start time. Further, a cell start time ($T_s$) equal to a required time for reproduction from the head position of an information data piece, to which a cell belongs, to the head position of each of the units, as well as the unit start time ($t_{s,u}$) are recorded in VTSI. A required time for reproduction ($P_s$) of each of cells is also recorded in VTSI.

In the present invention, when a plurality of information data groups are recorded, respective management data VTSI #i (i=1,2, . . . ) are collectively recorded at predetermined positions on the disk, for example, in a management data region defined in an inner peripheral region, as shown in FIG. 4. Also, backup data BUP #i (i=1,2, . . . ) are similarly recorded in a recording region. In this event, BUP #i is preferably recorded continuously to the recording region for VTSI #i. Further, the disk common data VMGI is also recorded in the management data region. For the management data region, a sufficient recording region has been previously reserved for recording a presumably maximum amounts of VTSI #i and BUP #i. While information data groups are recorded in an information data region, VOB need not be recorded in the order of VTSI corresponding thereto, and empty regions may be included therein.

In the present invention, the management data VTSI further includes attribute information data indicative of a recording scheme for each of the information data groups VOBS. The attribute information data includes video display information such as an encoding scheme for convenience of decoding, as well as a scanning speed, the number of scanning lines, an aspect ratio and so on for convenience of displaying reproduced data. For example, in an example shown in FIG. 5, the attribute information data is classified into 12 modes. The information data groups are recorded or reproduced on the basis of the attribute information data, wherein the same kind of attribute information data is preferably recorded in the same VTSI.

In the following, recording and reproducing operations of the digital data recording/reproducing apparatus, which is an embodiment of the present invention, will be described with reference to the flow charts shown in FIGS. 6-11.

Figure 6:
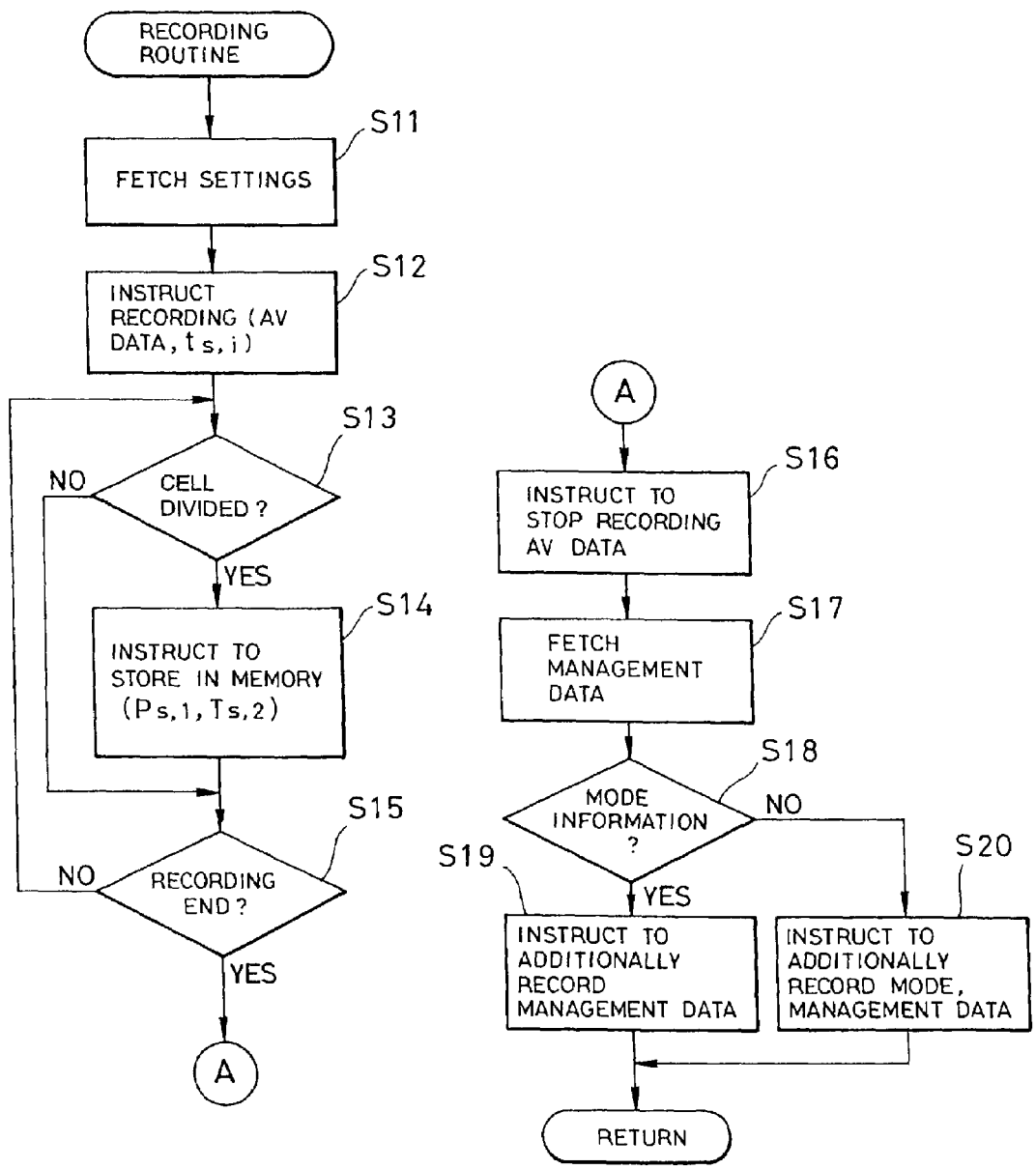
FIG. 6 is a flow chart illustrating a procedure for a recording operation processing routine according to the present invention.

FIG. 6 illustrates an example of a procedure for a recording operation processing routine executed by the system control circuit 10. The system control circuit 10 fetches settings for a recording instruction or the like such as a recording mode and a recording time, entered by the user through the manipulation unit 30, from the memory 35 (step 11). Then, the system control circuit 10 issues an instruction to the recording/reproducing control circuit 15 to record audio/video data (hereinafter called the "AV data") and unit start times ($t_{s,i}$, i=1,2, . . . ) in an empty region within the information data region in a desired recording mode (step 12). The system control circuit 10 determines whether or not an interrupt instruction has been entered by the user through the manipulation unit 30, such as a cell division instruction, i.e., chapter setting or the like (step 13). Continuing the description with reference to FIG. 3, when an interrupt instruction has been entered for chapter setting or the like, the system control unit 10 assigns the unit start time ($t_{s,u}$) at the time the interrupt instruction has been entered (assuming the time of a unit #u in a cell #S) to a new cell start time ($T_{s,2}$), and stores in the memory 35 the new cell start time ($T_{s,2}$) together with a required time for reproduction ($P_{s,1}$) of a newly created preceding cell (units #1 to #u−1) after the division (step 14). Next, the system control circuit 10 determines whether or not the AV data has been recorded on the basis of the recording settings by the user (step 15). If the AV data has been recorded, the recording operation is terminated (step 16). Next, the system control circuit 10 fetches management data previously stored in the memory 35 from the memory 35 (step 17). It should be noted that the digital data recording/reproducing apparatus according to the embodiment reads all management data recorded in a management data region of a disk and stores them into the memory 35, when the disk was loaded thereinto, such that the management data is managed on the memory 35 while the disk is loaded in the apparatus. Next, the system control circuit 10 determines whether or not the attribute information data of the recorded AV data has already been included in the management data (step 18). If already included, VTSI including the same attribute information data as that of the just recorded AV data is overwritten by the management information (step 19). If the same attribute information data has not been included, VTSI including the management data and the attribute information data are newly recorded in addition to the existing VTSI (step 20), followed by the completion of the recording operation processing.

Figure 7:
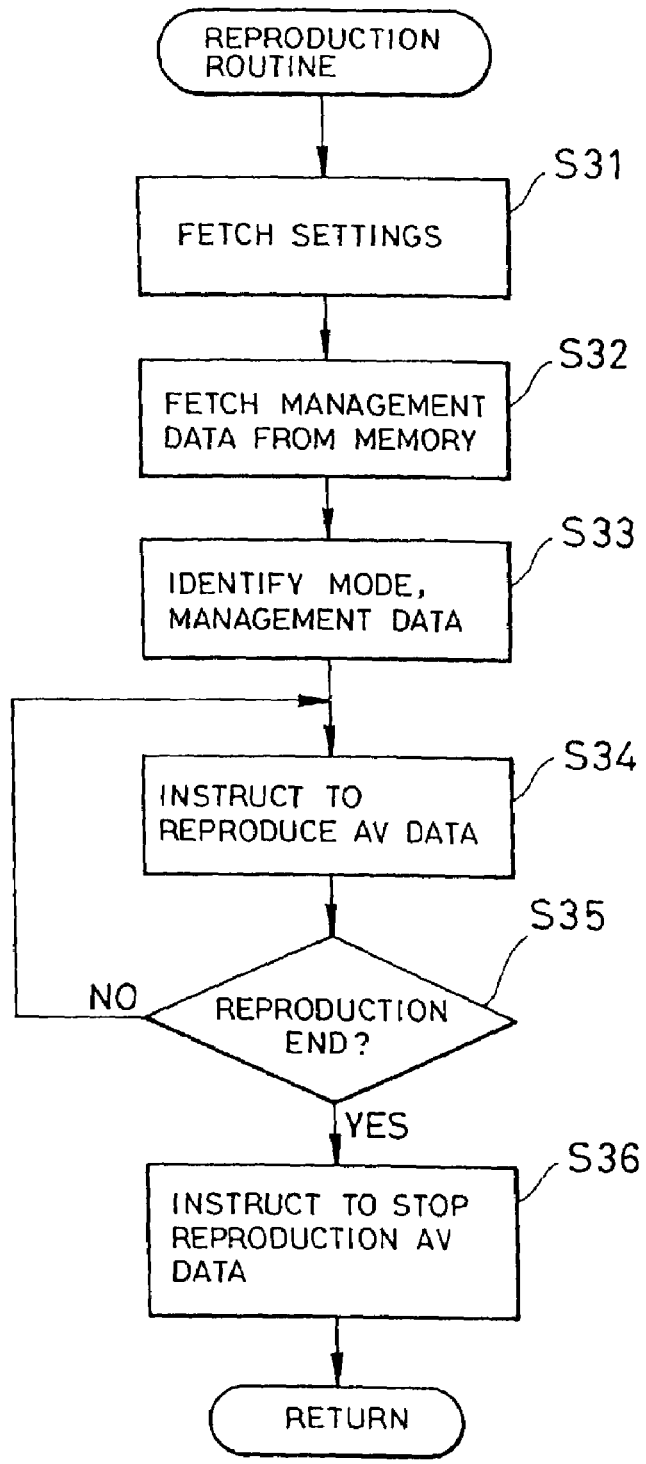
FIG. 7 is a flow chart illustrating a procedure for a reproducing operation processing routine according to the present invention.

FIG. 7 illustrates an example of a procedure for a reproducing operation processing routine executed by the system control circuit 10. The system control circuit 10 fetches settings for a desired program to be reproduced or the like, entered by the user, from the memory 35 (step 31). Next, the system control circuit 10 retrieves management data previously read from a disk and stored in the memory 35, when the disk was loaded, from the memory 35 (step 32), and identifies a mode and management data associated with the desired program to be reproduced from the retrieved management data (step 33). Next, the system control circuit 10 issues an instruction to the recording/reproducing control circuit 15 to reproduce AV data associated with the desired program based on the identified mode and management data (step 34). The system control circuit 10 determines whether or not the AV data based on the settings has been reproduced (step 35), and issues a reproduction stop instruction if the AV data has been reproduced (step 36), followed by the completion of the reproducing operation processing.

Figure 8:
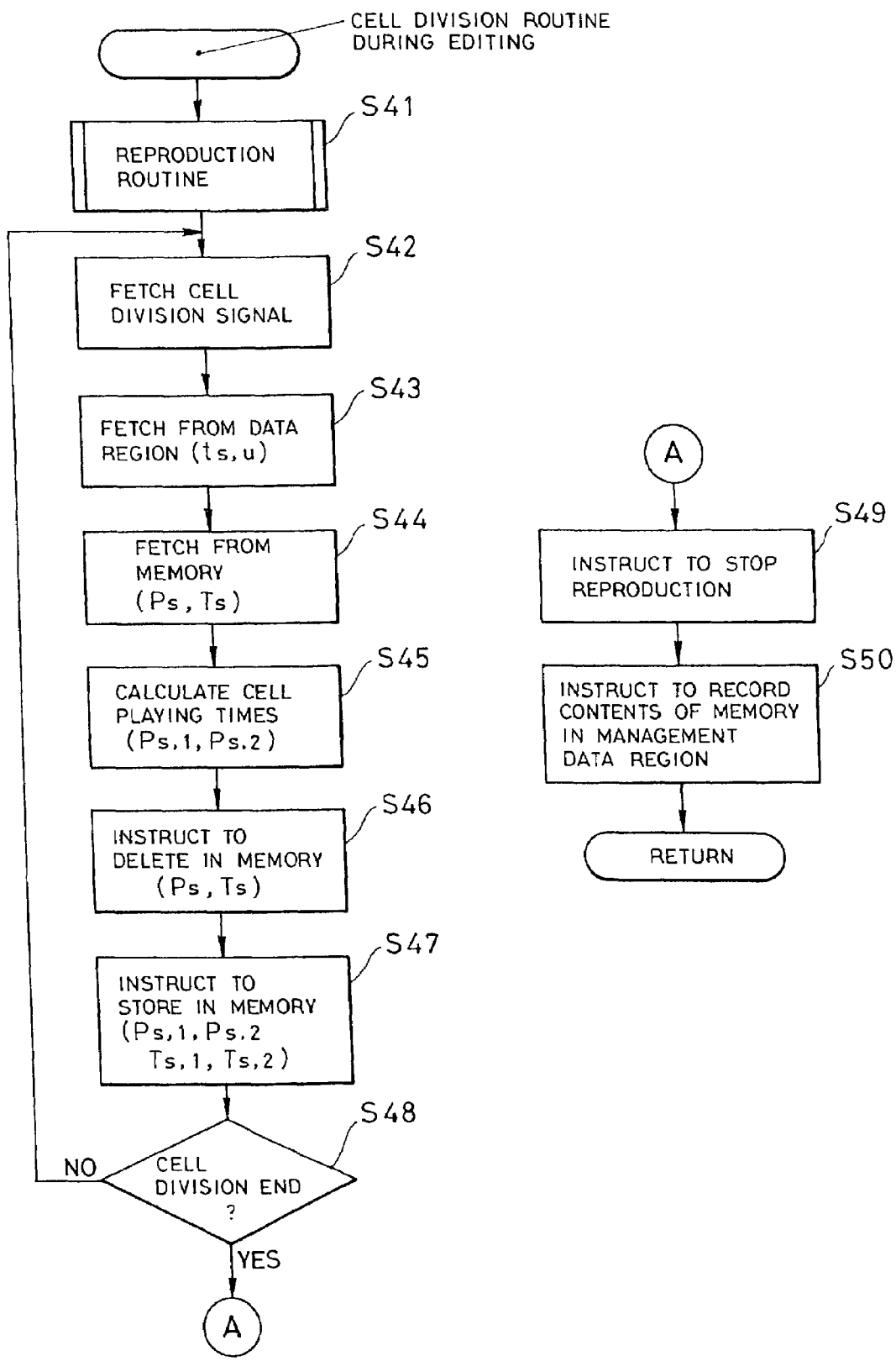
FIG. 8 is a flow chart illustrating a procedure for a cell division processing routine according to the present invention.

FIG. 8 illustrates an example of a procedure for a cell division processing routine for editing such as chapter setting, erasure or the like. The system control circuit 10 calls are producing routine, and instructs a disk reproducing operation (step 41). Describing with additional reference to FIG. 3, when a cell division signal is entered from the manipulation unit 30 during reproduction, the system control circuit 10 fetches the signal (step 42), and extracts a unit start time ($t_{s,u}$) at that time from the reproduced data (step 43). Next, the system control circuit 10 fetches a required time for reproduction ($P_s$) and a cell start time ($T_s$) of a cell, to which the unit belongs before division, from the memory 35 in which such data read from a disk have been stored when the disk was loaded (step 44). Next, the system control circuit 10 calculates required times for reproduction (denoted by $P_{S,1}$, $P_{S,2}$, respectively) of the two divided cells from the foregoing three values ($P_s$, $T_s$, $t_{s,u}$) (step 45). Then, the system control circuit 10 deletes the required time for reproducing the cell ($P_s$) and the cell start time ($T_s$) before the division from the memory 35 (step 46), and stores the required times for reproducing the resultant cells ($P_{s,1}$, $P_{s,2}$) and cell start times (denoted by $T_{s,1}$, $T_{s,2}$, respectively) in the memory 35 (step 47). The system control circuit 10 determines whether or not the cell division processing has been terminated (step 48), and repeats the flow from the fetching of signals (step 42) if not terminated, and issues a reproduction stop instruction if the cell division processing has been terminated (step 49). Then, the system control circuit 10 issues an instruction to the recording/reproducing control circuit 15 to record the management data stored in the memory 35 in the management data region on the disk (step 50), followed by the completion of the cell division processing.

Figure 9:
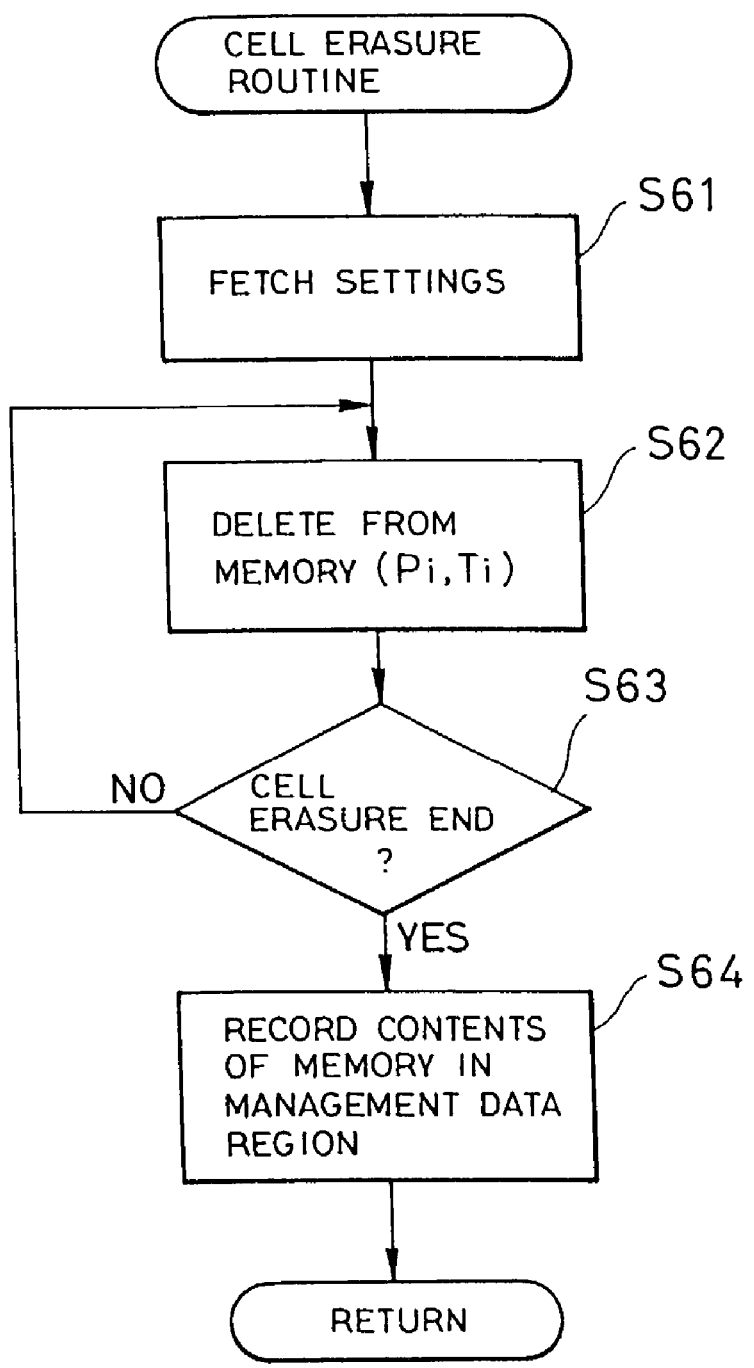
FIG. 9 is a flow chart illustrating a procedure for a cell erasure processing routine according to the present invention.

FIG. 9 illustrates an example of a procedure for a cell erasure processing routine during editing. The system control circuit 10 fetches desired cell erasure settings entered by the user from the memory 35 (step 61), and deletes a playing time and a cell start time of a cell, which has been specified for erasure, from management data on the memory 35 (step 62). Next, the system control circuit 10 determines whether or not the specified cell has been erased (step 63), and repeats the flow from the deletion of data from the memory (step 62) if not erased, and issues an instruction to the recording/reproducing control circuit 15 to record the management data stored in the memory 35 in the management data region on the disk (step 64) if erased, followed by the completion of the cell erasure processing.

Figure 10:
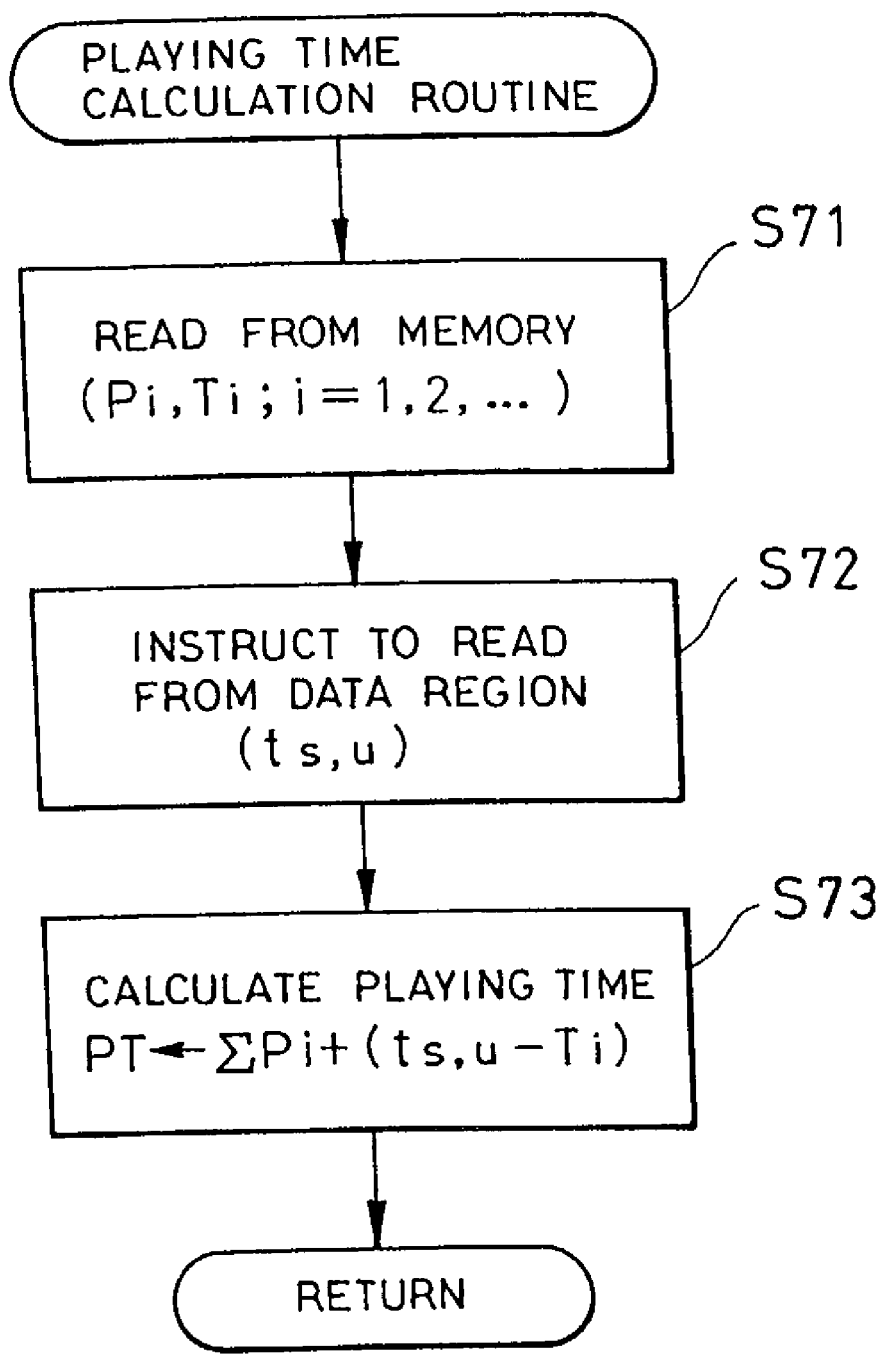
FIG. 10 is a flow chart illustrating a procedure for a playing time calculation routine according to the present invention.

FIG. 10 illustrates an example of a procedure for a playing time calculation routine for use by the system control circuit 10 during are producing operation. The system control circuit 10 fetches a required time for reproduction ($P_i$) and a cell start time ($T_i$) of each of cells in an information data piece, which has been specified for reproduction, from management data on the memory 35 (step 71). Then, the system control circuit 10 fetches a unit start time ($t_{s,u}$) of a unit under reproduction (step 72), calculates the sum of a total sum of required times for reproduction of cells preceding to the cell under reproduction ($\Sigma P_i$; i=1,2, . . . ,s−1) and the value derived by subtracting a cell start time of the cell under reproduction from the unit start time of the unit under reproduction ($t_{s,u}-T_s$), and assigns the resultant value as a playing time (step 73). Therefore, even if a cell preceding to the cell under reproduction, for example, a cell #k (1<k<S) has been already erased, a required time for reproduction ($P_k$) of the erased cell is not included in the sum ($\Sigma P_i$) of the required times for reproduction of the cells, thus making it possible to correctly calculate a playing time. The playing-time calculation processing is completed after executing the foregoing steps.

Figure 11:
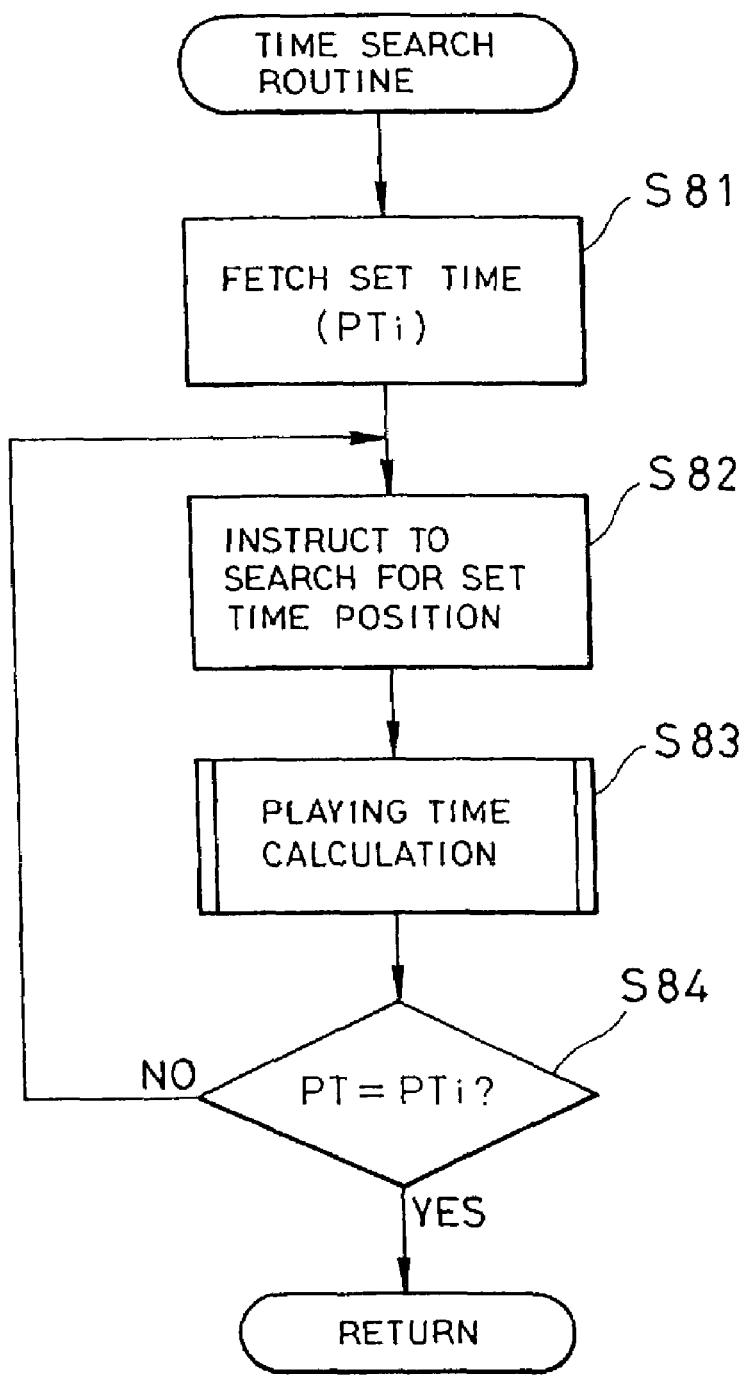
FIG. 11 is a flow chart illustrating a procedure for a time search routine according to the present invention.

FIG. 11 illustrates an example of a procedure for a time search routine for searching for a reproduced position based on a playing time. The system control circuit 10 fetches a desired reproduction time from the memory 35 (step 81), and instructs the recording/reproducing control circuit 15 to perform a reproducing operation near the position corresponding to the desired reproduction time (step 82). Next, the system control circuit 10 calls the playing-time calculation routine to calculate the playing time at the current position from a unit start time ($t_{s,u}$) of a unit under reproduction, and makes a search such that the calculated playing time is coincident with the desired reproduction time (step 83). Then, the system control circuit 10 determines whether or not the calculated playing time is equal to the set time (step 84), and completes the time search processing at the time they are equal.

As previously described above with reference to FIG. 3, according to the present invention, by using a unit start time read from a reproduced position, and a cell start time and a required time for reproduction of a unit recorded on a recording medium and stored in a memory, while relying on the head position of a information data piece under reproduction as a reference time, it is possible to realize a digital data recording/reproducing apparatus which is capable of readily performing a calculation of a reproduction elapsed time at an arbitrary reproduced position, a time search, and so on even if an information data piece, which has undergone editing such as chapter setting, erasure or the like after recording, is to be reproduced from a midway position. Also, by including attribute information data indicative of a reproducing scheme for information data groups in management data, and recording or reproducing the information data groups on the basis of the attribute information data, one or a plurality of information data groups having different attributes can be freely processed for recording, reproduction, editing and so on.

Further, by collectively recording the management data in a predetermined management data region and continuously recording information data groups having different attributes in a predetermined information data region, a recording region is free from blank invalid regions, and a longer recording time can be achieved.

While the foregoing embodiment has been described for a recording/reproducing apparatus which handles DVD-R/W, the present invention can be applied to apparatus which handle other kinds of recording disk media, and storage devices such as a semiconductor memory or the like.

As described above in detail, according to the present invention, when compressed digital data is recorded/reproduced using a variable bit rate coding, even if information data which has undergone editing such as chapter setting, erasure or the like after recording is reproduced from a midway position, time information on reproduction at that position can be derived.

What is claimed is:

1. A recording signal generating apparatus for receiving an information data piece and management data relating to said information data piece to generate a data signal to be recorded on a recording medium, said information data piece comprising a plurality of data cells, said management data including cell reproduction time periods of said plurality of data cells, comprising:
   a divider for dividing said plurality of data cells into a series of data units in accordance with a predetermined data format;
   a first calculator for calculating unit start timings for the respective data units, each of the unit start timings representing a time period required for reproduction of data from a head position of said information data piece up to a head position of each of the data units,
   a second calculator for calculating cell start timings for the respective data cells using the cell reproduction time periods, each of the cell start timings representing a time period required for reproduction of data from a head position of said information data piece up to a head position of each of the data cells,
   a first modifier for modifying said information data piece by adding each of data pieces which represent the respective unit start timings to the corresponding data unit in accordance with the predetermined data format to generate a modified information data piece;
   a second modifier for modifying said management data by inserting data representing the cell start timings into said management data in accordance with the predetermined data format to generate modified management data; and
   a generator for combining said modified information data piece and said modified management data to generate a data signal to be recorded on said recording medium.

2. A recording signal generating apparatus according to claim 1, further comprising:
   a receiver for receiving a cell division instruction which specifies one of the data units in one of said plurality of data cells and instructs to divide said one of said plurality of data cells; and
   an editor, in response to said cell division instruction, for dividing said one of said plurality of data cells in two to edit said modified management data by inserting therein the unit start timing of a specified unit as a cell start timing.

3. A recording signal generating apparatus according to claim 1, further comprising:
   a memory for storing the reproduction time periods for said plurality of data cells and the cell start timings;

a third calculator for receiving an indication indicating a unit start timing of a unit which is under reproduction to calculate a reproduction elapsed time using the indicated unit start timing, stored reproduction time periods for said plurality of data cells and stored cell start timings.

4. A method for generating a data signal to be recorded on a recording medium, comprising the steps of:
receiving an information data piece and management data relating to said information data piece, said information data piece comprising a plurality of data cells, said management data including cell reproduction time periods of said plurality of data cells;
dividing said plurality of data cells into a series of data units in accordance with a predetermined data format;
calculating unit start timings for the respective data units, each of the unit start timings representing a time period required for reproduction of data from a head position of said information data piece up to a head position of each of the data units,
calculating cell start timings for the respective data cells using the cell reproduction time periods, each of the cell start timings representing a time period required for reproduction of data from a head position of said information data piece up to a head position of each of the data cells,
modifying said information data piece by adding each of data pieces which represent the respective unit start timings to the corresponding data unit in accordance with the predetermined data format to generate a modified information data piece;
modifying said management data by inserting data representing the cell start timings into said management data in accordance with the predetermined data format to generate modified management data; and
combining said modified information wherein the steps of receiving, dividing, calculating unit start timings, calculating cell start timings, modifying, and combining are performed by a controller data piece and said modified management data to generate a data signal to be recorded on said recording medium.

5. A method for generating a recording signal according to claim 4, further comprising the steps of:
receiving a cell division instruction which specifies one of the data units in one of said plurality of data cells and instructs to divide said one of said plurality of data cells; and
dividing, in response to said cell division instruction, said one of said plurality of data cells in two to edit said modified management data by inserting therein the unit start timing of a specified unit as a cell start timing.

6. A method for generating a recording signal according to claim 4, further comprising the steps of:
storing the reproduction time periods for said plurality of data cells and the cell start timings;
receiving an indication indicating a unit start timing of a unit which is under reproduction; and
calculating a reproduction elapsed time using the indicated unit start timing, stored reproduction time periods for said plurality of data cells and stored cell start timings.

7. A method for recording information data on a recording medium, the recording medium having an information data area and a management data area, comprising the step of:
recording information data in the information data area,
determining whether or not attribute data of the information data is included in the existing management data in the management data area, the attribute data indicating the reproduction scheme for the information data, and
recording the management data in addition to the existing management data, when it is determined that the attribute data of the information is not included in the recorded data in the management data area; and
overwriting wherein the steps of recording, determining, and overwriting data are performed by a controller the management data including attribute data identical to the attribute data of the information data when it is determined that the attribute data of the information data is included in the existing management data.

8. A recording apparatus for recording information data on a recording medium, the recording medium having first information data and first management data for reproducing the first information data, the apparatus comprising:
a recording device which records second information data, and
a controller,
wherein the controller determines whether or not the second data has an attribute identical to an attribute of the first information data,
wherein if the second information data has the identical attribute, the controller controls the recording device so as to overwrite the first management data,
if the second information data has a different attribute from the attribute of the first information data, the controller creates second management data and controls the recording device so as to record the second management data.

9. A recording apparatus according to claim 8, wherein the first and second management data are recorded in a management data area.

10. A recording apparatus according to claim 8, wherein the first and second information data are recorded in an information data area.

11. A recording method for recording information data on a recording medium, the recording medium having first information data and first management data for reproducing the first information data, the method comprising:
recording second information data, and
determining whether or not the second data has an attribute identical to an attribute of the first information data,
wherein if the second information data has the identical attribute, overwriting the first management data,
if the second information data has a different attribute wherein the steps of recording, determining are performed by a controller from the attribute of the first information data, creating second management data and recording the second management data.

12. A recording method according to claim 11, wherein the first and second management data are recorded in a management data area.

13. A recording method according to claim 11, wherein the first and second information data are recorded in an information data area.

* * * * *